US005131973A

United States Patent [19]

Feldkamper

[11] Patent Number: 5,131,973

[45] Date of Patent: Jul. 21, 1992

[54] DELIVERY DEVICE FOR BAGS WITH FRESHLY GLUED BASES

[75] Inventor: Richard Feldkamper, Lengerich, Fed. Rep. of Germany

[73] Assignee: Windmoller & Holscher, Lengerich, Fed. Rep. of Germany

[21] Appl. No.: 599,798

[22] Filed: Oct. 19, 1990

[30] Foreign Application Priority Data

Oct. 19, 1989 [DE] Fed. Rep. of Germany ....... 3934879

Jan. 25, 1990 [DE] Fed. Rep. of Germany ....... 4002156

[51] Int. Cl.[5] ............................................ B32B 31/04

[52] U.S. Cl. ................................ 156/555; 156/583.5; 493/186; 493/264; 493/454

[58] Field of Search ............................ 156/555, 583.5; 493/110, 112, 186, 264, 318, 319, 454

[56] References Cited

U.S. PATENT DOCUMENTS 1,676,005 7/1928 Conti .

2,032,503 3/1936 Rosmait ............................ 493/264

2,119,951 6/1938 Dunnebier .

2,242,799 5/1941 Moore .

3,107,984 10/1963 Novick .

4,488,928 12/1984 Alikhan et al. ..................... 156/555

FOREIGN PATENT DOCUMENTS 211597 7/1909 Fed. Rep. of Germany .

313866 7/1919 Fed. Rep. of Germany .

442805 4/1927 Fed. Rep. of Germany .

511159 10/1930 Fed. Rep. of Germany .

1066854 10/1959 Fed. Rep. of Germany .

1298873 7/1969 Fed. Rep. of Germany .

307914 2/1930 United Kingdom .

762264 11/1956 United Kingdom ............ 156/583.5

*Primary Examiner*—Caleb Weston

*Attorney, Agent, or Firm*—Fleit, Jacobson, Cohn, Price, Holman & Stern

[57] ABSTRACT

A delivery device is disclosed for bags having freshly glued bases. A series of squeeze cylinders and endless squeeze belts are provided to define a conveying path having the shape of a twin S. As a procession of bags traverses each cylinder, the opposite bag edges are squeezed between pairs of the belts.

11 Claims, 2 Drawing Sheets

DELIVERY DEVICE FOR BAGS WITH FRESHLY GLUED BASES

BACKGROUND OF THE INVENTION

This invention relates to a delivery device for bags with freshly glued bases and which comprises at least one twin belt conveyor adapted to squeeze the bottom parts of the bags with endless pressing belts.

The freshly glued bases of bags have to be squeezed directly after they have been produced in order to prevent the bases from becoming unstuck and unfolding and to produce satisfactorily bonded or glued bases by pressing on the bottom parts of the bags.

A delivery device of this type is disclosed in German patent 1,298,873. The device has two belt conveyors, consisting of pressing belts, for a stack of the bags which had just been produced, the device operating such that the pressing belts squeeze the bottom parts of the bags. Since the pressing action has to be maintained for a sufficiently long time, the twin belt conveyors pressing on the stacks have to have a considerable lengths and this leads to an undesired bulkiness of the plant for producing such bags.

SUMMARY OF THE INVENTION

One object of the present invention is to devise provide a bag delivery device which has a short overall length.

In accordance with the invention, the twin belt conveyor has endless squeeze belts which are arranged in vertical planes on top of each other and are adapted to take up the bags in overlapped succession between them. The conveyors are trained around at least two squeeze cylinders defining a conveying path in a letter S configuration, or in the case of there being more than two squeeze cylinders, defining a conveying path with a multiple letter S configuration.

In the delivery device in accordance with the invention, a conveying path with a single or multiple letter S configuration is provided for squeezing the overlapped procession of bags so that the overall length of the squeeze path may be considerably shortened.

It is convenient if two pairs of squeeze cylinders having endless squeeze belts trained around them and each with a letter S conveying path are provided. This arrangement makes it possible to arrange sections of the squeeze path in a plurality of planes so that there is an additional reduction of the length of the plant.

In accordance with a further convenient feature of the invention the pairs of squeeze cylinders are arranged approximately symmetrically about a vertical plane which is parallel to the axes of the squeeze cylinders. In this respect it is possible for two respective squeeze cylinders of the two cylinder pairs to be placed nearer and farther from the plane of symmetry.

In accordance with a further feature of the invention the design is such that each of the squeeze cylinders is provided with its own squeeze belts. In this case the arrangement is then preferably such that the output ends of the twin belt conveyors—consisting of the squeeze belts —of the preceding squeeze cylinder, transfer the overlapped bags to the intake gap of the twin belt conveyor of the following squeeze cylinder. In order to ensure a properly aligned conveyance of the overlapped bags, the respectively outer squeeze belts of the twin belt conveyor are preferably idler belts.

The conveyance of the overlapped bags by a twin belt conveyor with endless upper and lower runs, which pass over two spaced bend cylinders, is disclosed in German patent 530,526. Between the two bend cylinders, the two runs of the twin belt conveyor form a straight conveyor path, along which the runs are moved at different speeds, because on passage over the bend cylinders the respectively outer runs are caused to move at a higher speed. Owing to the speed differential between the two conveyor runs of the twin belt conveyor the overlapped bags are drawn together so that the spacing and the settings of the individual bags in the overlapped procession thereof are irregularly altered.

In the delivery device in accordance with the invention there is fundamentally a requirement for the overlapped bags being conveyed on the squeeze path to be drawn apart with an increase in the distance between and pulling apart of consecutive overlapped bags in order to overcome any tendency of the superposed bags to be stuck together by glue dripping or being squeezed out of the seams. In accordance with a further feature of the invention the device is accordingly so designed that the squeeze belts of the twin belt conveyors pass around at least one following squeeze cylinder at a higher speed than the speed of a preceding squeeze cylinder. This higher speed causes the overlapped, superposed bags to be drawn apart with a regular, even increase in the pitch of the overlapped bags so that any tendency of the bags to adhere together is decreased. Since the bags are conveyed by a preceding twin belt conveyor so that their leading edges separately enter the intake nip of the twin belt conveyor running at a higher speed, the individual bags are drawn from the arriving procession of overlapped bags with an increasing overlap pitch without their being displaced in any other way so that the only change in the overlapped procession is that the pitch is increased.

It is convenient to provide a twin belt conveyor, consisting of squeeze belts and having a straight path, to feed the squeeze cylinder running at a higher speed. It is then convenient if the squeeze belt, forming the lower run, of the straight path is trained, as the inside belt, around the following squeeze cylinder, the uppers that is to say outsider squeeze belts of the straight conveying path and of the following squeeze cylinder being separate from each other. This prevents the squeeze belts of the twin belt conveyor running at different speeds in relation to each other in the straight conveyor path.

In a case in which there are two pairs of squeeze cylinders, it is furthermore expedient if the last pair of the squeeze cylinders revolves at a higher speed.

Since the overlapped bags only have to be squeezed together in the bottom parts thereof, the squeeze belts may only be arranged adjacent of the two bottoms of the bags. In this case the overlapped bags are conveyed with transverse alignment so that the bottom parts thereof are to the outside, that is to say at the sides of the overlapped procession of bags.

A further possible feature of the invention is such that two outer separate squeeze belts are provided adjacent to the bottom parts of the bags, such belts being associated with the bottom parts with their different number of plies. This feature takes into account the fact that the outside parts of each bottom have less plies, for instance only two plies, whereas the bottom part overlapping a bag wall is thicker owing to the presence of the plies of the two bag walls.

BRIEF DESCRIPTION OF THE DRAWINGS

Working embodiments of the invention will now be described in detail with reference to the drawings.

DESCRIPTION OF PREFERRED EMBODIMENT

Figure 1:
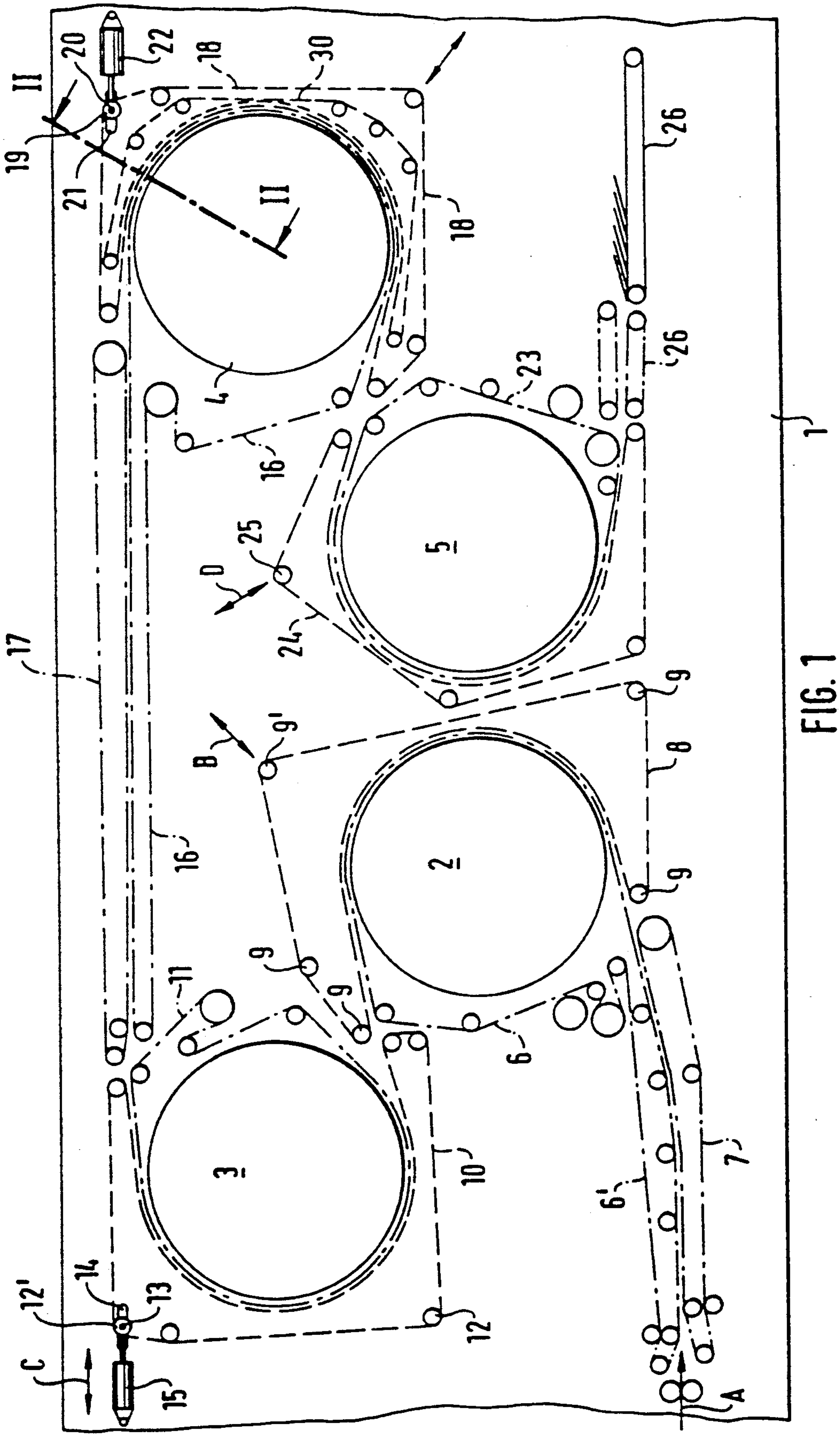
FIG. 1 is a diagrammatic side view of a bag delivery device with twin belt conveyors running over four squeeze cylinders.

In the rear wall 1 of a frame, whose front wall is not shown, four idling squeeze cylinders 2, 3, 4 and 5 are mounted as shown in FIG. 1. The first cylinder 2 has a first driven pair 6 of axially spaced belts trained about it over a major circumferential angle, such belt pair being extended as an intake belt 6'. In the part, in which the belt pair 6 acts as an intake belt pair 6' a further belt pair 7 is associated therewith so that the overlapped procession arriving in the direction A assumes a position between the belt pairs 6' and 7. Adjacent to the output end of the belt pair 7 there is a further idler belt pair 8, which is trained around the cylinder 2 over a major angle just like the belt pair 6. The belt pair 8 is in this respect guided by guide pulleys 9, of which one pulley 9' may be displaced in the direction of the arrow B for altering the tension of the belt. After an overlapped bag procession has moved around the cylinder 2, the procession passes between two belt pairs 10 and 11, trained around the cylinder 3 over a major angle, the belt pair 11 being driven and running directly on the cylinder 3. The belt pair 10 has guide pulleys 12, one of which 12' is able to be shifted in the direction of the arrow C in order 30 to modify the tension of idler belt pair 10. For this purpose a support pin 13 of the guide pulley 12' is held in a longitudinal groove 14 so that the guide pulley 12' may be changed in position using a piston and cylinder unit 15. Adjacent to the output end of the belt pairs 10 and 11 there are further belt pairs 16 and 17, both of which are driven and of which the belt pair 16 is trained around the squeeze cylinder 4 over a major angle. Adjacent to the zone of such training of the belts an idler belt pair 18 engages the belt pair 16. A support pin 20 of a guide pulley 19 is mounted in slots 21 to be adjusted in position by piston and cylinder units 22 in order to change the belt tension. Just as was the case with the cylinder 4, the further squeeze cylinder 5 following it has a belt pair 23 trained about and resting directly on it, and an outer belt pair 24 on the part with an effective conveying action. Just as is the case with the squeeze cylinders 2, 3 and 4 the belt pair 23 (which is directly trained about the cylinder 5) is driven, while the outer belt pair 24 is freely entrained, i.e. idles. Of the guide pulleys of this outer belt pair 24 the guide pulley 25 is able to be adjusted in the direction of the arrow D in order to reset the tension of the outer belt pair 24. The procession of overlapped bags leaving the squeeze cylinder is then removed by further belts 26.

Figure 2:
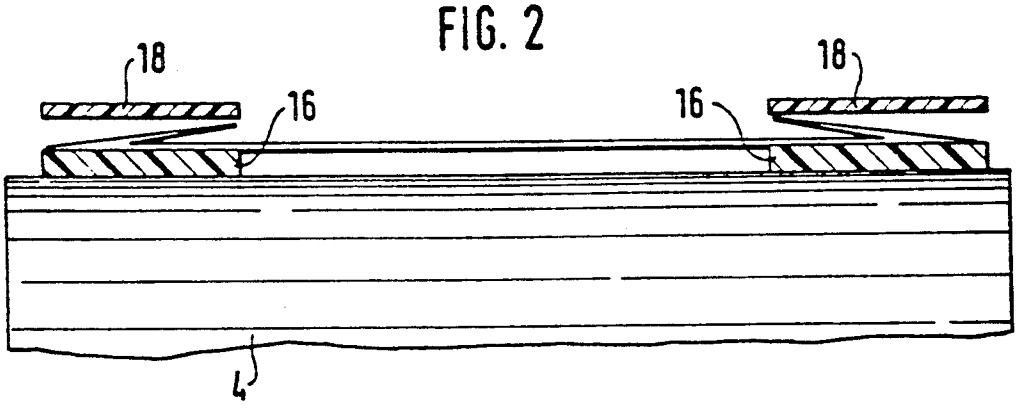
FIG. 2 is a section, on line II—II of FIG. 1, through a squeeze cylinder and the squeeze belts trained thereabout.
Figure 3:
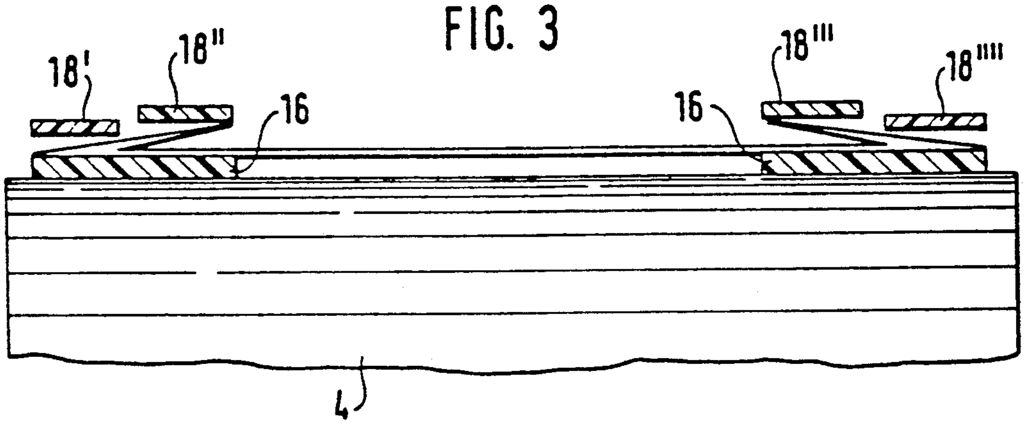
FIG. 3 is a section similar to that of FIG. 2 with two outer separate squeeze belts arranged in pairs.

In the illustrated embodiment, the belt pairs 6 and 11 trained about the cylinders 2 and 3 are driven at the same speed, while the inner belt pairs 16 and 23 directly trained about the cylinder 4 and 5 on the surface thereof are driven a speed which is slightly above that of the belt pairs 6 and 11. This feature ensures that an increase in pitch of the overlapped bags coming from the cylinder 3 is precisely effected, such increase taking place as the overlapped procession is received between the belt pairs 16 and 17. It will be seen from FIG. 2 that the belt pair 18 consists of two belts or belt elements, whereas in the embodiment shown in FIG. 3, the idler outside belt pair partly trained about the cylinder 4 consists of four individual belts or elements 18' to 18''''. The embodiment in accordance with FIG. 3 offers the advantage that the tensions of the belts 18' through 18'''' may be individually reset in a manner to suit the thickness of the bag base. Adjacent to the belts 18'' and 18''' the base consists of four plies, while adjacent to the belts 18' and 18'''' it is composed of only two plies. In the case of very thin material this difference is of no great import so that the embodiment of FIG. 2. may be used. If however a bag is to produced consisting of very thick material, it is preferable to adopt the design in accordance with FIG. 3. In the case of the example in accordance with FIG. 3, it is necessary to provide a plurality of the piston and cylinder units 22. Although FIGS. 2 and 3 are only related to the squeeze cylinder 4, it is clear that the outside belt pairs 2, 3 and 5 could be designed in a similar manner.

Figure 4:
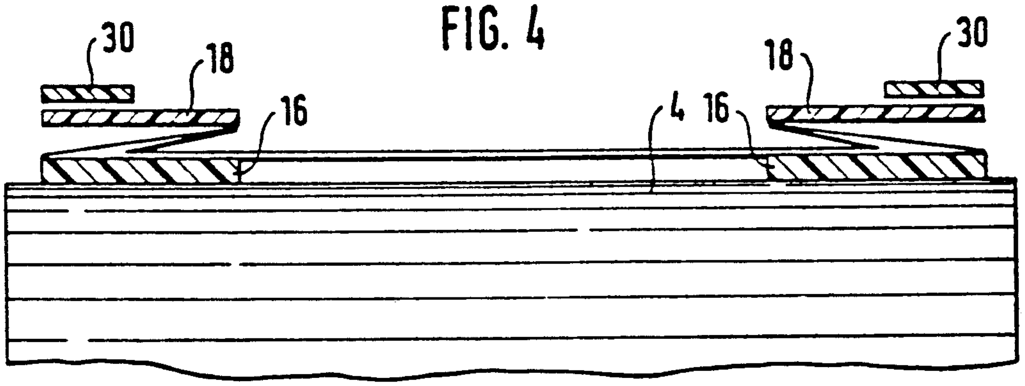
FIG. 4 is a section similar to that of FIG. 2 in which however the outer parts of the squeeze belts are pressed upon by additional narrower squeeze belts which are only located adjacent outer bottom parts of a bag having a smaller number of plies.

In the illustrated working embodiment of FIG. 4, the broader belts of the belt pair 18 have respective narrower belts 50 bearing on them, which are only located adjacent to the outer base parts of the bags with a lesser number of plies so that this base part is also subject to a thrust which is approximately equal to the thrust acting on the inner base part, which owing to the overlapping bag walls has a larger number of plies.

The additional belt pair 30 may be provided for all 20 cylinders 2 through 5, or however only for individual cylinders.

In order to allow the tension of the squeeze belts to be adjusted to respective working conditions, the squeeze belts may be arranged to be adjusted independently for each cylinder.

If no squeeze belts with a major tension or if additionally squeeze belts are provided, for the outer base parts of the bags, they are loaded by a smaller thrust owing to the smaller number of plies. It is thus possible to select squeeze belts which have such a high elasticity that despite the different numbers of plies in the two base parts, they exert approximately the same thrust on the entire base part.

I claim:

1. A delivery device for bags having freshly glued bases comprising first and second pressing cylinders with parallel axes, conveyor means wound around the cylinders for conveying the bags around the cylinders in an S-shaped conveying path, the conveyor means including axially spaced pairs of endless conveyor belts for squeezing opposite sides of each bag base therebetween as a procession of bags are conveyed around the respective cylinders in traversing the S-shaped conveying path wherein each of the pressing cylinders is provided with separate pairs of said conveyor belts.

2. A delivery device as claimed in claim 1, wherein delivery ends of the conveyor belts of a preceding cylinder in said path are adapted to transfer bags to intake gap of conveyor belts of a following cylinder.

3. A delivery device for bags having freshly glued bases comprising first and second pressing cylinders with parallel axes, conveyor means wound around the cylinders for conveying the bags around the cylinders in an S-shaped conveying path, the conveyor means including axially spaced paris of endless conveyor belts for squeezing opposite sides of each bag base therebetween as a procession of bags are conveyed around the respective cylinders in traversing the S-shaped conveying path, the device further including third and fourth pressing cylinders, the conveying means being wound around the third and fourth cylinders in a further S-shaped conveying path configuration wherein the conveyor belts of at least one following cylinder in said path are adapted to move at a higher speed than the belts of a preceding cylinder.

4. A delivery device as claimed in claim 3, wherein the belts adapted to move at the higher speed are preceded in said path by a straight conveying path between the paths of S-shaped configuration.

5. A delivery device as claimed in claim 4, wherein a belt forming a lower run of the straight conveying path is an extension of an inner belt trained around the following cylinder and an upper belt of the straight conveying path is separate from an outer belt on the following cylinder.

6. A delivery device for bags having freshly glued bases comprising first and second pressing cylinders with parallel axes, conveyor means wound around the cylinders for conveying the bags around the cylinders in an S-shaped conveying path, the conveyor means including axially spaced pairs of endless conveyor belts for squeezing opposite sides of each bag base therebetween as a procession of bags are conveyed around the respective cylinders in traversing the S-shaped conveying path, the device further including third and fourth pressing cylinders, the conveying means being wound around the third and fourth cylinders in a further S-shaped conveying path configuration wherein the third and fourth cylinders are adapted to rotate at a higher speed than the first and second cylinders.

7. A delivery device for bags having freshly glued bases comprising first and second pressing cylinders with parallel axes, conveyor means wound around the cylinders for conveying the bags around the cylinders in an S-shaped conveying path, the conveyor means including axially spaced pairs of endless conveyor belts for squeezing opposite sides of each bag base therebetween as a procession of bags are conveyed around the respective cylinders in traversing the S-shaped conveying path with the belts are arranged only to squeeze the opposite sides of the bags.

8. A delivery device as claimed in claim 7, including means for adjusting tension in at least some of said belts.

9. A delivery device for bags having freshly glued bases comprising first and second pressing cylinders with parallel axes, conveyor means wound around the cylinders for conveying the bags around the cylinders in an S-shaped conveying path, the conveyor means including axially spaced pairs of endless conveyor belts for squeezing opposite sides of each bag base therebetween as a procession of bags are conveyed around the respective cylinders in traversing the S-shaped conveying path wherein the belts wound around at least one of said cylinders include axially spaced inner belts covering the entire width of folded plies of the bags and axially spaced outer belts also covering the entire width of the folded plies.

10. A delivery device as claimed in claim 1, wherein the belts wound around said one of said cylinders further include additional outer belts disposed over outer margins of the inner belts.

11. A delivery device for bags having freshly glued bases comprising first and second pressing cylinders with parallel axes, conveyor means wound around the cylinders for conveying the bags around the cylinders in an S-shaped conveying path, the conveyor means including axially spaced pairs of endless conveyor belts for squeezing opposite sides of each bag base therebetween as a procession of bags are conveyed around the respective cylinders in traversing the S-shaped conveying path wherein the belts wound around at lest one of said cylinders include axially spaced inner belts covering the entire width of folded plies of the bags and axially spaced outer belts also covering the entire width of the folded plies.

* * * * *